US012803472B2

(12) United States Patent
Auletta et al.

(10) Patent No.: US 12,803,472 B2
(45) Date of Patent: Nov. 17, 2026

(54) ELECTROADHESIVE POLYMERS AND CLUTCH USING THE JOHNSEN-RAHBEK EFFECT

(71) Applicant: U.S. Army DEVCOM, Army Research Laboratory, Adelphi, MD (US)

(72) Inventors: Jeffrey T. Auletta, Edgewood, MD (US); Alex J. Langrock, Middle River, MD (US); Chad C. Kessens, Kenmore, WA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 5 days.

(21) Appl. No.: 18/785,012

(22) Filed: Jul. 26, 2024

(65) Prior Publication Data

US 2026/0031747 A1 Jan. 29, 2026

(51) Int. Cl.
*H02N 13/00* (2006.01)
*C09J 9/02* (2006.01)
(Continued)

(52) U.S. Cl.
CPC ................ *H02N 13/00* (2013.01); *C09J 9/02* (2013.01); *C09J 11/04* (2013.01); *C09J 179/04* (2013.01);
(Continued)

(58) Field of Classification Search
CPC ......... F16D 28/00; F16D 27/14; H02N 13/00; C09J 9/02; C09J 11/04; C09J 179/04; C08K 3/16
(Continued)

(56) References Cited

U.S. PATENT DOCUMENTS 5,525,642 A * 6/1996 Cipriano ................ H02N 13/00 192/84.4
10,138,953 B1 11/2018 Koenig et al.
(Continued)

FOREIGN PATENT DOCUMENTS

WO 2022232705 A1 11/2022
WO 2022232707 A1 11/2022
(Continued)

*Primary Examiner* — Richard M Lorence
(74) *Attorney, Agent, or Firm* — Alan I. Kalb

(57) ABSTRACT

A polymeric material having a volume resistivity appropriate for use as an electroadhesive (EA) material is described. The EA polymer may include ionic additives that may be used to tune the electrical resistivity of the EA material within a range such as $10^{9}$-$10^{13}$ Ω·cm allowing for electroadhesion using the Johnsen-Rahbek effect (JR effect). The EA force is orders of magnitude greater than that typically observed for so-called coulomb-only EA materials while operating at lower voltages. The EA polymer produces a strong EA pressure for very little power relative to overall system power, shows fast and reversible adhesion, is lightweight, and may be easily tailored for a specific application. The electrical resistivity of the EA polymer may be easily tuned by altering the weight fraction of ionic additive. The polymeric material may be easily cast into sheets, films, or molded for specific applications.

8 Claims, 12 Drawing Sheets

(51) Int. Cl.

| | |
|---|---|
| ***C09J 11/04*** | (2006.01) |
| ***C09J 179/04*** | (2006.01) |
| ***F16D 27/14*** | (2006.01) |
| ***F16D 28/00*** | (2006.01) |
| *C08K 3/16* | (2006.01) |

(52) U.S. Cl.
CPC ............. *F16D 27/14* (2013.01); *F16D 28/00* (2013.01); *C08K 3/16* (2013.01)

(58) Field of Classification Search
USPC .......................................................... 192/84.4
See application file for complete search history.

(56) References Cited

U.S. PATENT DOCUMENTS

| | | | |
|---|---|---|---|
| 10,554,154 | B2 | 2/2020 | Majidi et al. |
| 10,663,016 | B2 | 5/2020 | Schmitz et al. |
| 10,998,835 | B2 | 5/2021 | Majidi et al. |
| 2013/0010398 | A1 | 1/2013 | Prahlad et al. |

FOREIGN PATENT DOCUMENTS

| | | | | |
|---|---|---|---|---|
| WO | 2022241326 | A1 | 11/2022 | |
| WO | WO-2024112832 | A2 * | 5/2024 | ............. H02N 13/00 |

* cited by examiner

100

200

300

ELECTROADHESIVE POLYMERS AND CLUTCH USING THE JOHNSEN-RAHBEK EFFECT

GOVERNMENT INTEREST

The invention described herein may be manufactured, used and licensed by or for the U.S. Government.

BACKGROUND OF THE INVENTION

Existing electroadhesive (EA) materials may be difficult to tune and may only be available in limited form factors such as ceramics.

Thus there is a need for an EA material that is easily tuned and able to be deployed in various form factors.

BRIEF SUMMARY OF THE INVENTION

Some embodiments of the present invention provide a polymeric material having a volume resistivity appropriate for use as an EA material, referred to herein as an EA polymer. The EA polymer may include ionic additives that may be used to tune the electrical resistivity of the EA material within a range such as $10^9$-$10^{13}$ Ωcm allowing for electroadhesion using the Johnsen-Rahbek (JR) effect. The EA force is much greater than that typically observed for so-called coulomb-only EA materials while operating at lower voltages (e.g., less than one thousand volts versus five thousand volts or greater). The EA polymer produces a strong EA pressure for very little power relative to the overall system power, shows fast and reversible adhesion, is lightweight, and may be easily tailored for a specific application. The electrical resistivity of the EA polymer may be easily tuned by altering the weight fraction of ionic additive in the final composition. The polymeric material may be easily cast into sheets, films, or molded for specific applications as opposed to ceramic materials used in other devices. The EA polymer represents the first polymeric material with the requisite mechanical and electrical properties for use as a JR type EA.

The JR effect has not been previously achieved using a polymeric material. The effect is primarily described for doped ceramics. Unexpectedly, polybenzimidazole (PBI) doped with a small weight fraction (or mass fraction) of ionic additive (e.g., less than five percent weight by weight (w/w)) was found to produce the JR effect. PBI polymers are primarily used for flame retardant clothing, high strength components, and as a membrane separator in fuel cells.

The EA polymer may include an ionic additive and/or low vapor pressure solvent (e.g., dimethylacetamide) to lower the volume resistivity to within the $10^9$-$10^{13}$ Ωcm range. The ionic additives may include, for example, alkali/alkaline earth metal halide, alkyl halide, aryl halide, and/or ionic liquid. The EA polymer may be cast into a film, sheet, tube, or may be coated on a conductive substrate. An electric potential may be applied across the material in contact with another conductive surface, producing a strong electrostatic attraction.

The EA material of some embodiments is polymeric, in contrast to existing solutions that use doped ceramic as dielectric materials used to produce the JR effect. As such, the properties of the EA material may be easily tuned and spray coated, dip coated, or processed to provide a variety of form factors for a given application. The material density is two to five times lower than ceramic-based EAs, thus providing significant size and weight savings.

The EA material may be utilized as a component of EA brakes and clutches, variable stiffness dampers, morphing wing structures, telescopic robotic limbs, passive energy recovery, electroactive gripper surfaces, wall-climbing robots, launch and/or perching pads for unmanned aerial vehicles (UAVs), haptic feedback devices, variable stiffness structures, exoskeletons, robotic end effectors, and quick-release attachment points, among other applications.

A clutch of one or more embodiments may include a housing and stator shaft which may include many separate braking faces and/or clutch plates. In the case of one braking face, one stator plate may include, for example, a carbon fiber shim to which a film of the EA polymer may be coupled. The stator plate may clutch to a metal layer of, for example, stainless steel shim or sputter-coated conductive metal on polymer film (e.g., aluminized polyethylene terephthalate) embedded within the housing. The metal layer and EA film may be electrically isolated from one another so that free flow of electrical current is not possible unless the two surfaces are in close contact. When an electrical potential is applied, the two surfaces may be strongly bonded together due to the JR effect, thus locking the stator to the housing. The holding force of the clutch may be tuned by the driving potential when in DC mode, or the clutch may act as a mechanical damper when driven with a bipolar DC waveform across various frequencies and amplitudes. The clutch stack may include discrete braking faces having multiple layers of EA polymer and metal. In this way, the braking force may scale approximately linearly with the number of braking faces.

BRIEF DESCRIPTION OF DRAWINGS

The novel features of the disclosure are set forth in the appended claims. However, for purposes of explanation, several embodiments are illustrated in the following drawings.

DETAILED DESCRIPTION OF THE INVENTION

Figure 1:
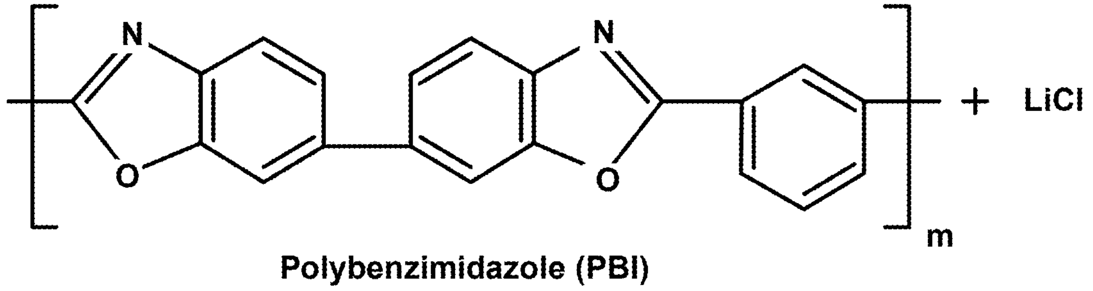
FIG. 1 illustrates a chemical structure diagram of an EA polymer of one or more embodiments described herein.

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide an EA polymer. The EA polymer may include ionic additives that may be used to tune the electrical resistivity of the EA material within a range such as $10^{9}$-$10^{13}$ Ωcm allowing for electroadhesion using the JR effect.

The EA polymer 100 enables applications such as clutches and/or variable dampers with the highest ever reported braking torque density and lowest power density for operation to date. The braking torque density is approximately ten times higher than that of the state-of-the-art electromagnetic clutches or brakes while requiring eighty thousand times less power for operation (e.g., milliwatts rather than watts of power draw).

In the case of purely Coulombic electroadhesion, the EA pressure is governed primarily by the applied voltage, the thickness of the dielectric, and the dielectric constant. The consequence of the governing equations is that to produce a significant EA pressure, the dielectric constant must be sufficiently high (on the order of tens or hundreds for E) or the material thickness sufficiently low (on the order of tens of microns) to produce a meaningful holding force at a reasonable voltage (e.g., less than one thousand volts). However, typically, the dielectric constant is on the order of three to ten, and the thickness around twenty to fifty μm, requiring very high driving voltages over three thousand to five thousand volts to achieve even a modest holding force. When applying such a high voltage, this is often not feasible due to the dielectric breakdown strength of the material. Several strategies have been presented to overcome these limitations. Thin films have been prepared (on the order of one to two am), which may lower the driving voltage to hundreds of volts but are difficult to fabricate and fragile when handling. Another strategy is to boost the dielectric constant using an additive such as high dielectric constant ceramic particles of barium titanate in a polymer composite, but while the driving voltage is lowered, the holding pressure does not increase substantially above approximately fifty kPa.

In contrast to purely Coulombic electroadhesion, JR type electroadhesion is not limited by the thickness of the material and is primarily governed by the applied voltage and the size of the gap between substrate and dielectric. A prerequisite for manifesting the JR effect is that the dielectric itself must have a volume resistivity on the order of $10^{9}$-$10^{13}$ Ω·cm. In this case, when a voltage is applied across the surface of a dielectric in contact with a conducive substrate, much of the potential drop occurs within the gap between the dielectric and the metal. Typically, the gap is composed of air and is on the order of a few microns or less. When a large voltage is applied, much of the voltage drop occurs within this small gap, resulting in an extremely large EA pressure. The main drawback to this approach is the current flow, and consequently power draw, are typically higher, but still only nA to μA of current at μW to mW are typically observed in a device. When current limited, the devices are safe to operate near humans even when driven at over one thousand volts.

Until now, mainly ceramic EA materials have been described utilizing the JR effect typically for use in semiconductor processing for wafer chucking during etching and lithography. These ceramic materials require timely and costly processing conditions. The form factor is also determined at this stage and cannot be easily adjusted to arbitrary geometries. These chucks are comprised of high-density ceramics that add to the size and weight required. In contrast, the EA polymer 100 may be easily spray-coated, dip-coated or cast into films and sheets in a variety of forms and shapes. The electrical resistivity of the EA polymer 100 may also be tuned easily by changing the weight fraction of ionic dopant in the final polymer composite.

The EA polymer 100 allows for robotic legs, for example, to save a significant fraction of energy during walking, running, or stance locomotion phases. As another example, the EA polymer 100 may provide a blocking force in robotic grippers for object manipulation. The EA polymer 100 may be used as a lightweight, low power, clutch surface for morphing wing structures.

FIG. 1 illustrates a chemical structure diagram of an EA polymer 100 of one or more embodiments described herein. As shown, the EA polymer 100 may include a polymer (e.g., PBI) and ionic dopant (e.g., lithium chloride (LiCl)). Other ionic additives may be used, such as alkali/alkaline earth metal halides, alkyl halides, aryl halides, acids, and/or ionic liquids.

In some embodiments, a film may be cast from a solution of PBI in dimethylacetamide solvent (e.g., one to thirty percent w/w). A small weight fraction of ionic component may be dissolved into the film. Films cast from the polymer in solution may be dried in a convection oven to remove the solvent and may range in thickness from, for example, five μm to one mm and may include a small weight fraction (e.g., less than one percent) of solvent as a plasticizer in a final composition. A low weight fraction (e.g., zero to ten percent) of ionic additive may be used to render the electrical resistivity within the range required for the JR effect ($10^{9}$-$10^{13}$ Ω·cm). The ionic additive may take the form of alkali/alkaline earth metal halides, alkyl halides, aryl halides, acids, or ionic liquids. PBI may be patterned through soft lithography or mold casting to promote jamming by shear or made smooth through spin casting or doctor blade coating to ensure a nominal air gap between PBI and conductor.

Figure 2:
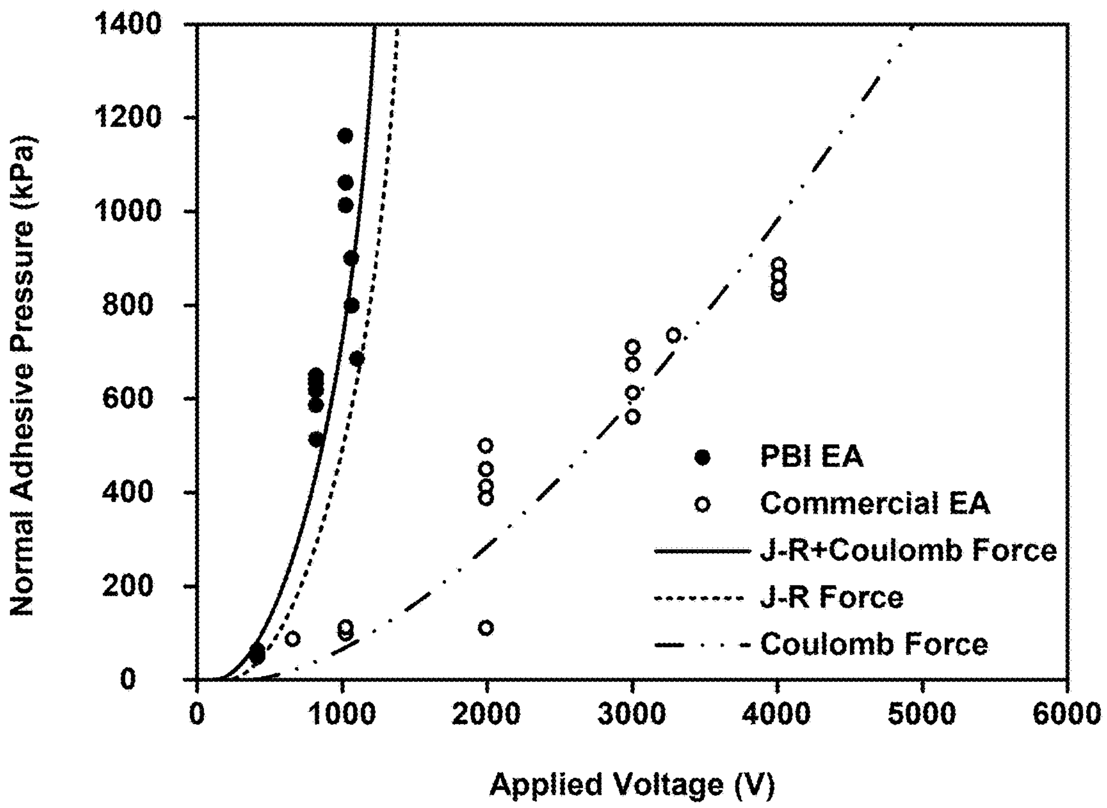
FIG. 2 illustrates a two-dimensional plot of normal adhesive pressure versus applied voltage for the EA polymer of one or more embodiments.

FIG. 2 illustrates a two-dimensional plot 200 of normal adhesive pressure versus applied voltage for the EA polymer 100. A sliding friction test was conducted at various applied voltages and the EA pressure measured against conductive glass indium-tin oxide. Both films were of the same thickness (fifty-five to sixty am). The commercial EA material required operation at four thousand volts to achieve the same normal adhesive pressure as the EA polymer 100 at about one thousand volts.

When the volume resistivity of the dielectric material is greater than $10^{13}$ Ω·cm, the EA pressure can be modeled as a parallel plate capacitor with a dielectric layer in contact with a flat conductive surface. This is the case of typical coulombic electroadhesion as predicted by Equation 1, below:

$$\frac{F}{A} = \frac{\varepsilon_0}{2}\left(\frac{k_d V}{d}\right)^2 \quad (1)$$

where $\varepsilon_0$ is the vacuum permittivity, $k_d$ the dielectric constant of the material, V the applied voltage, d the thickness of the dielectric, F the EA force normal to the surface, and A the apparent area of contact. The predicted normal adhesive force for a sixty am film of polyimide, where $k_d$ is between three and four, is shown in the example of FIG. 2. Here, the applied voltage, dielectric constant, and thickness of the material significantly affect electroadhesion, because the EA pressure (F/A) scales with the square of these parameters.

In contrast, the JR effect appears when the volume resistivity of the material is on the order of $10^9$-$10^{13}$ Ω·cm and considering the same parallel plate geometry as before, the clamping pressure is predicted by Equation 2 below:

$$\frac{F}{A_{eff}} = \frac{\varepsilon_0}{2}\left(\frac{k_g V_{eff}}{g}\right)^2 \quad (2)$$

where $k_g$ is the dielectric constant of the gap, g the gap thickness, $V_{eff}$ is the effective voltage, and $A_{eff}$ is the effective area of contact.

In this case, much of the applied voltage drop occurs in the micron to nanoscale gap between the dielectric and the underlying substrate being contacted. Because the dielectric contacts the substrate at only a small number of protruding surface asperities, the resulting contact resistance, $R_c$, is significantly greater than the bulk resistance of the dielectric, $R_b$. As a result, much of the applied voltage drop occurs in this gap as given by Equation 3 below:

$$V_{eff} = V\left(\frac{R_c}{R_c + R_b}\right) \quad (3)$$

As such, the EA pressure is independent of the dielectric material thickness and depends primarily on the applied voltage and the size of the gap. Since the gap thickness, g, is orders of magnitude smaller than the thickness of the dielectric, d, the resulting EA pressure for a JR EA is significantly greater than for a Coulomb-only material at a given applied voltage.

As shown, the EA pressure for EA polymer 100 is significantly greater at one thousand volts (approximately one thousand one hundred kPa) compared to polyimide film of the same thickness (approximately one hundred kPa). The EA pressure is a sum of both coulomb and JR forces, although the coulomb force is typically significantly weaker than the JR force. As shown, EA polymer 100 matches closely with the normal adhesive pressure predicted by Equations 1-3.

Figure 3:
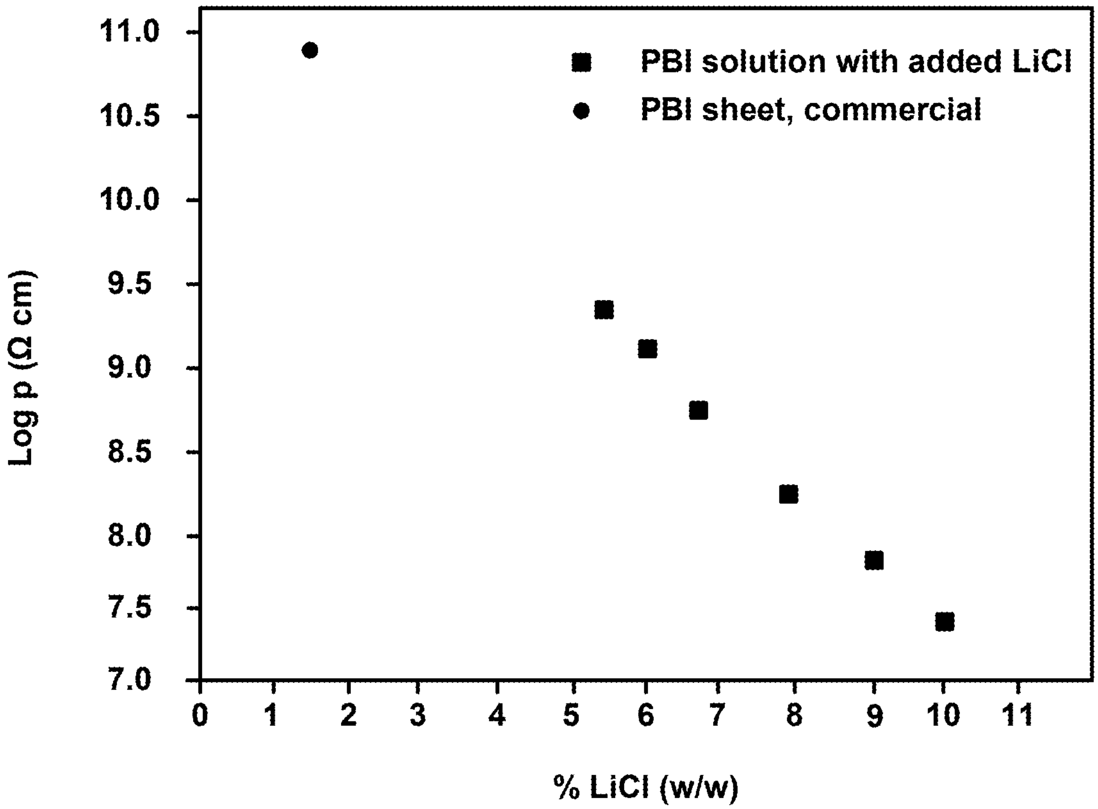
FIG. 3 illustrates a two-dimensional plot of volume resistivity versus concentration of lithium chloride for the polymer of one or more embodiments.

FIG. 3 illustrates a two-dimensional plot 300 of volume resistivity versus concentration of lithium chloride for the polymer of one or more embodiments. As shown, the volume resistivity of the EA polymer 100 may be easily tuned using LiCl as the ionic additive. Commercially available PBI sheet was also measured and found to be within the range of volume resistivity for manifesting the JR effect.

Figure 4:
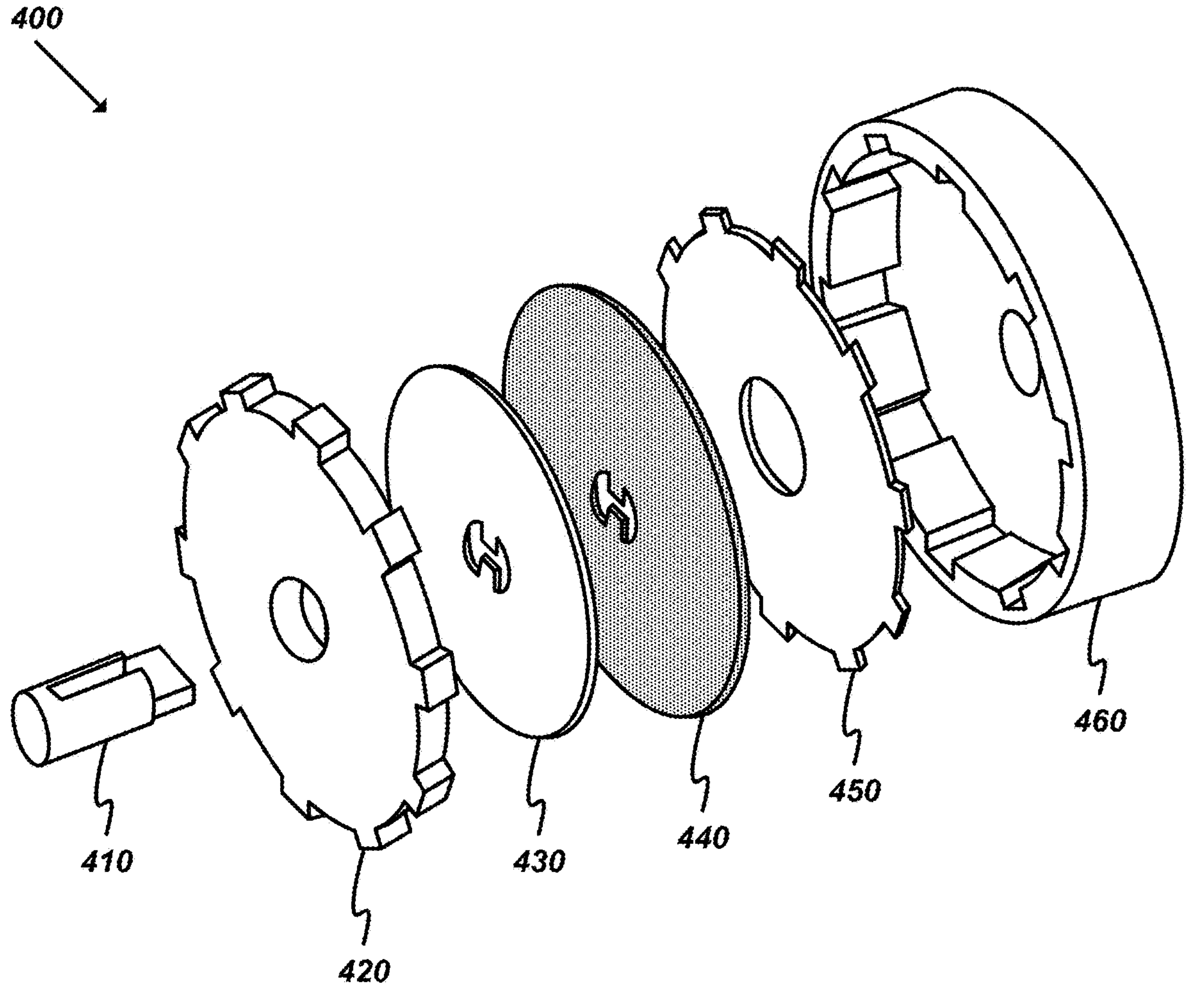
FIG. 4 illustrates an exploded view of an EA clutch of one or more embodiments described herein.

FIG. 4 illustrates an exploded view of an EA clutch 400 of one or more embodiments described herein. As shown, the EA clutch 400 may include a shaft 410, a cap 420, a backing plate 430, EA film 440, a conductive plate or shim 450, and a stator 460.

Cap 420 and stator 460 may house the EA film 440 mounted on a shaft 410 and supported by a conductive backing plate 430 (e.g., a carbon fiber shim). The EA film 440 may be mounted using double-sided carbon tape or other conductive adhesive to firmly bond the film to backing plate 430. The surface of EA film 440 may sit flush against conductive plate 450 (e.g., a steel shim and/or other electrically conductive substrate) which may slide along the cutouts shown in the stator 460. The assembly of shim backing plate 430 and EA film 440 (also referred to as a "stator plate") may also slide freely along the shaft length and may be pressed against conductive plate 450 by the cap 420.

In the absence of a driving voltage, the assembly of shaft 410, shim backing plate 430, and EA film 440 may freely slip against the surface of conductive plate 450 (where the coefficient of friction (CoF) may be, for example, two-tenths). When a voltage is applied across backing plate 430 and EA film 440, the slotted shaft 410 may allow for transmission of torque, temporarily bonding the shaft 410 and the assembly of shim backing plate 430 and EA film 440 to conductive plate 450 inside stator 460, producing a holding force.

In this example, only one set of clutch faces are shown (between EA film 440 to conductive plate 450), however, multiple clutch faces may be easily included given the thin nature of each component.

Figure 5:
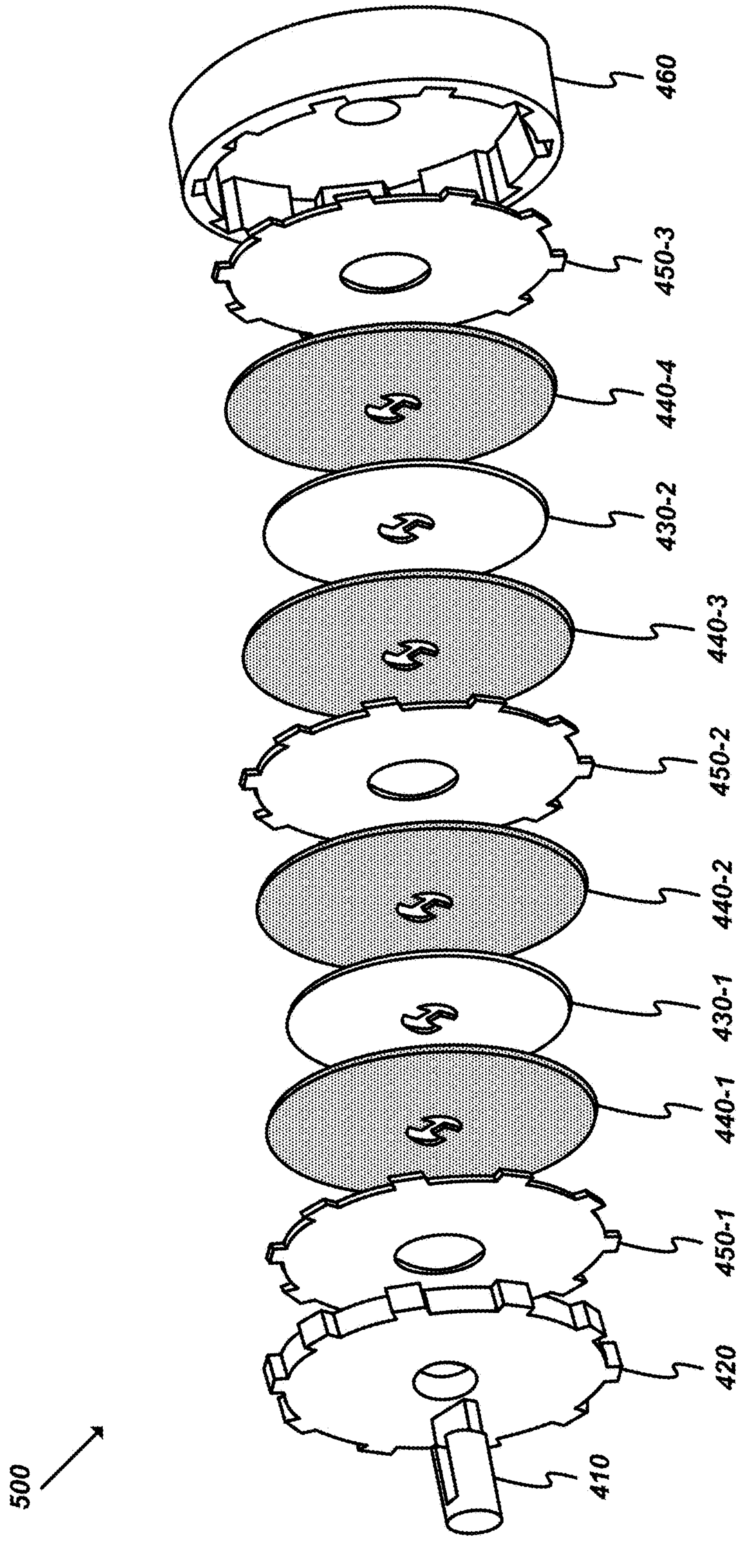
FIG. 5 illustrates an exploded view of an EA clutch with multiple braking surfaces of one or more embodiments described herein.

FIG. 5 illustrates an exploded view of an EA clutch 500 with multiple braking surfaces of one or more embodiments described herein. The EA clutch 500 may include the same types of components as EA clutch 400.

The example multilayered EA clutch 500 includes four separate braking surfaces formed between conductive shims 450-1, 450-2, and 450-3 and EA film 440-1, 440-2, 440-3, and 440-4. In this example, EA polymer 100 may be bonded to both sides of the backing plates 430-1 and 430-2. The conductive shims 450-1, 450-2, and 450-3 may be activated separately or conjunctively, allowing activation of separate clutch sections of the EA clutch 500. The stator 460 and shaft 410 may be sized appropriately to allow more braking surfaces as needed for a given application. As with EA clutch 400, the shaft 410 may be slotted to accommodate the backing plates 430-1 and 430-2 and the EA film 440-1, 440-2, 440-3, and 440-4.

For both EA clutches 400 and 500, an internal diameter of the conductive plate 450 may be slightly larger than the internal diameter of the shaft 410 to allow electrical isolation and prevent electrical arcing between the shaft 410 and conductive shim(s) 450. Similarly, the diameter of the EA film 440 may be slightly larger than that of the backing plates 430 in order to prevent electrical arcing with the conductive shim(s) 450. In practice, a separation of one to two mm was found necessary.

Depending on the nature of the DC voltage signal, the EA clutches 400 and/or 500 may operate as a clutch when a constant DC voltage is applied or as a damper if a time-variant DC voltage is applied (e.g., a square, triangle, or sine wave).

The EA clutches 400 and/or 500 may use a stacked plate design described herein. Stacking allows the torque density of the clutch to be significantly increased without substantially increasing the radius or volume of the device. Existing architectures may utilize a "drum brake" configuration where the EA material is parallel to the shaft rotation instead of perpendicular as in EA clutches 400 and 500. Such an approach limits the geometry of the "drum brake" design, which must either incorporate concentric drums or widen the drum surface to increase the holding torque. Additionally, such devices are based on "traditional" Coulomb-only electroadhesion, which limits the EA pressure generated by these devices to hundreds of kPa at best. The EA polymer 100 may harness the JR effect, exceeding one thousand kPa, as measured experimentally.

Figure 6:
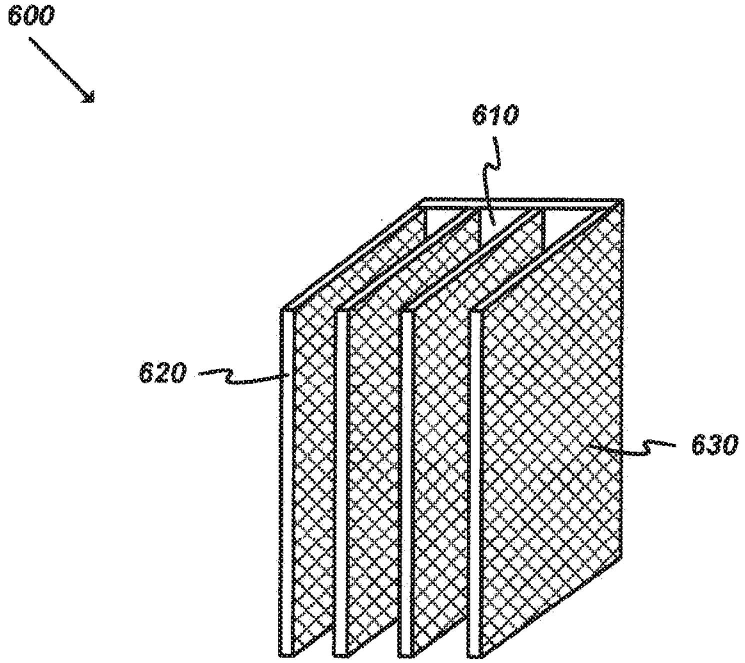
FIG. 6 illustrates a perspective view of an interlocking fin half assembly of one or more embodiments described herein.
Figure 7:
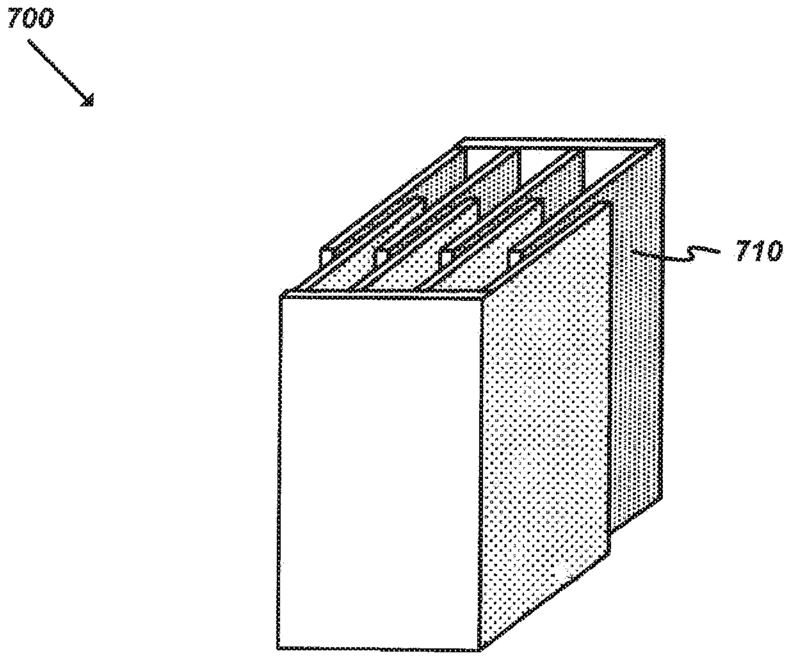
FIG. 7 illustrates a perspective view of an interlocking fin full assembly of one or more embodiments described herein.

FIG. 6 illustrates a perspective view of an interlocking fin half assembly 600 of one or more embodiments described herein. FIG. 7 illustrates a perspective view of an interlocking fin full assembly 700 of one or more embodiments described herein. As shown, the interlocking fin half assembly 600 may include a base 610, multiple fins 620, and a coating 630 (e.g., a dielectric material or conductor, as appropriate). The interlocking fin full assembly 700 may include complementary interlocking fin half assemblies 600. In this example, a first interlocking fin half assembly 600 includes dielectric material 710 and a second interlocking fin half assembly 600 includes conductive material.

The interlocking fin full assembly 700 provides greater surface area to volume as both faces of a fin 620 may be utilized for electroadhesion, thus enabling miniaturization without sacrificing holding force. Each fin 620 may have a specified thickness, height, and spacing relative to adjacent fins 620. The base 610 may have a specified thickness, width, and length. The base 610 and fins 620 may be 3D printed (for example) and made to be compliant (or flexible) or rigid. In this example, the interlocking fin half assembly 600 has a rectangular geometry.

Figure 8:
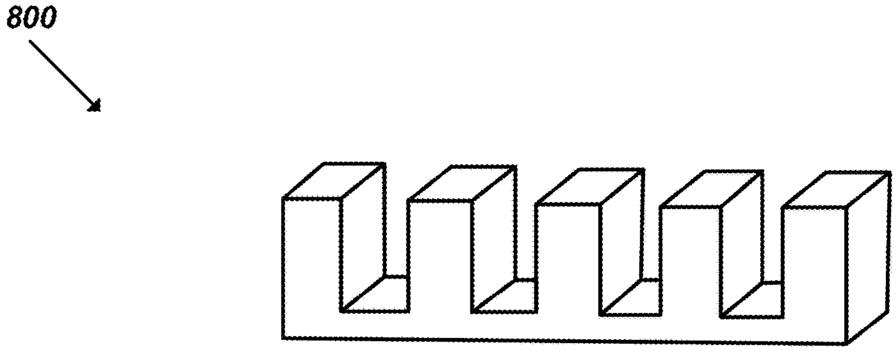
FIG. 8 illustrates a perspective view of a rectangular interlocking fin of one or more embodiments described herein.
Figure 9:
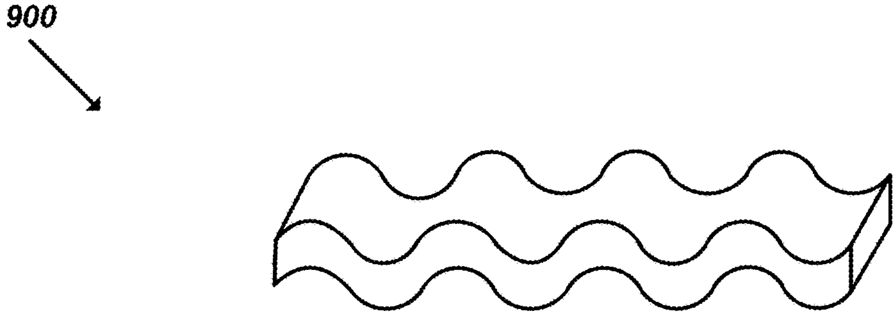
FIG. 9 illustrates a perspective view of a concave-convex interlocking fin of one or more embodiments described herein.
Figure 10:
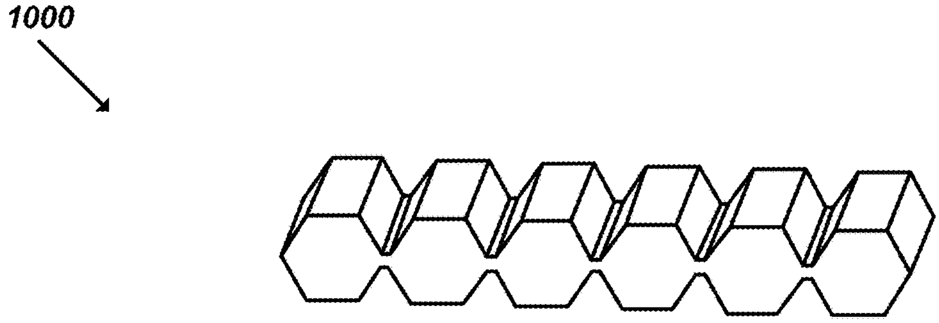
FIG. 10 illustrates a perspective view of a hexagonal interlocking fin of one or more embodiments described herein.
Figure 11:
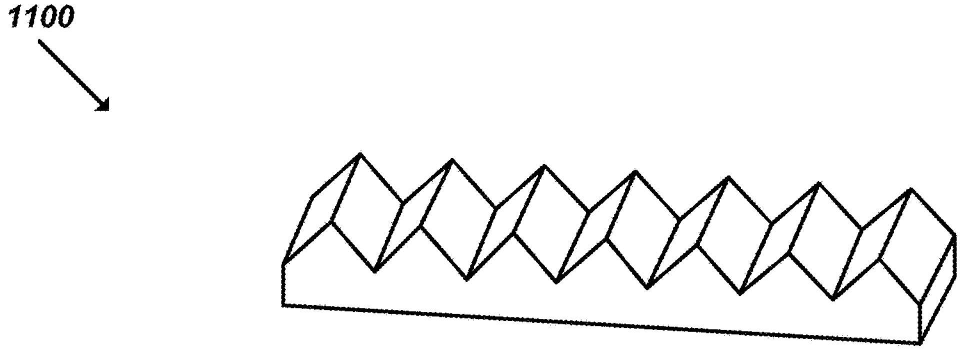
FIG. 11 illustrates a perspective view of a triangular interlocking fin of one or more embodiments described herein.

FIG. 8 illustrates a perspective view of a rectangular interlocking fin 800 of one or more embodiments described herein. FIG. 9 illustrates a perspective view of a concave-convex interlocking fin 900 of one or more embodiments described herein. FIG. 10 illustrates a perspective view of a hexagonal interlocking fin 1000 of one or more embodiments described herein. FIG. 11 illustrates a perspective view of a triangular interlocking fin 1100 of one or more embodiments described herein.

As shown in FIG. 8, FIG. 9, FIG. 10, and FIG. 11, the fins may be implemented using various surface geometries, such as rectangular, wavy, hexagonal, and triangular. Contoured and non-planar geometries may further increase the static friction or stiction between interlocking fins. The dimensions of the fin features, such as height, spacing, and thickness may range from one micrometer to one centimeter.

Two common limitations of flexible EA pads for gripping and manipulating are the lack of resistance to normal forces and the inability to adhere to non-polarizable or rough surfaces. An EA pad of some embodiments may utilize a dual CoF approach having a flexible low CoF material (e.g., having a CoF less than four tenths) and a stretchable high CoF material (e.g., having a CoF greater than four tenths). Two JR-active materials, PBI and a cross-linked aliphatic urethane acrylate (or "stiction polymer") with widely differing CoFs (e.g., PBI may have CoF of two tenths and stiction polymer may have a CoF of eight tenths) may be combined to improve adhesion to non-polarizable surfaces and rough surfaces without slowing disengagement time from a substrate or object. The stiction polymer provides greater resistance to an applied normal force due to a larger intrinsic surface adhesion, making it more difficult to peel off the EA pad from a substrate or object. The low Young's modulus of the stiction polymer (less than one hundred MPa) can also help in filling asperities and closing the gap between the EA and contacting surfaces. A series of concentric shapes may provide a greater level of stiction with electroadhesion. Non-concentric geometric patterns of the stiction polymer can be applied to PBI when surface roughness of the substrate or object is high and additional stiction is required.

Figure 12:
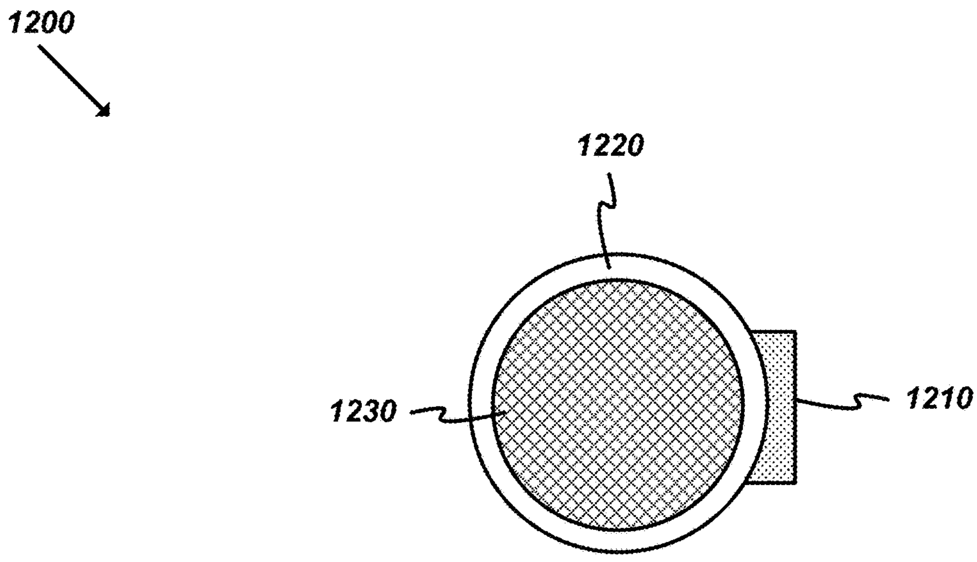
FIG. 12 illustrates a front elevation view of a circular EA pad of one or more embodiments described herein.

FIG. 12 illustrates a front elevation view of a circular EA pad 1200 of one or more embodiments described herein. As shown, the circular EA pad 1200 may include an electrode 1210, a stiction polymer section 1220, and a PBI section 1230.

Figure 13:
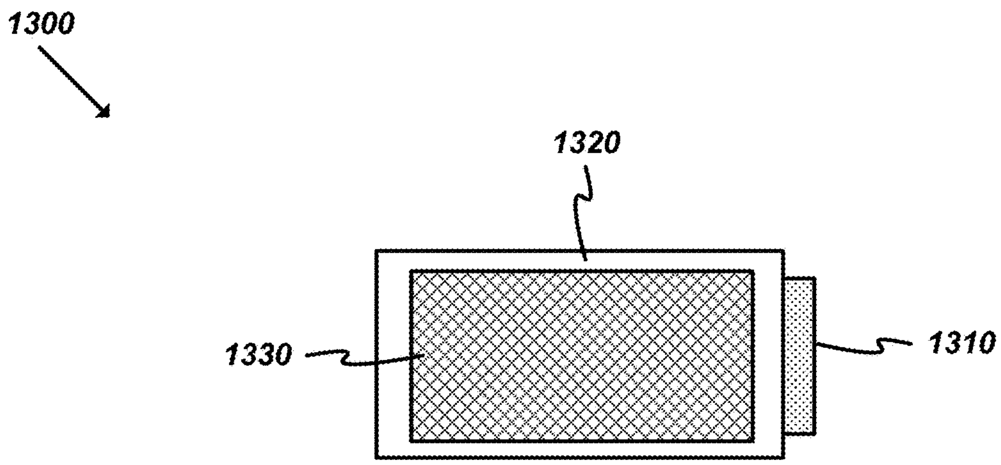
FIG. 13 illustrates a front elevation view of a rectangular EA pad of one or more embodiments described herein.

FIG. 13 illustrates a front elevation view of a rectangular EA pad 1300 of one or more embodiments described herein. As shown, the rectangular EA pad 1300 may include an electrode 1310, a stiction polymer section 1320, and a PBI section 1330.

Figure 14:
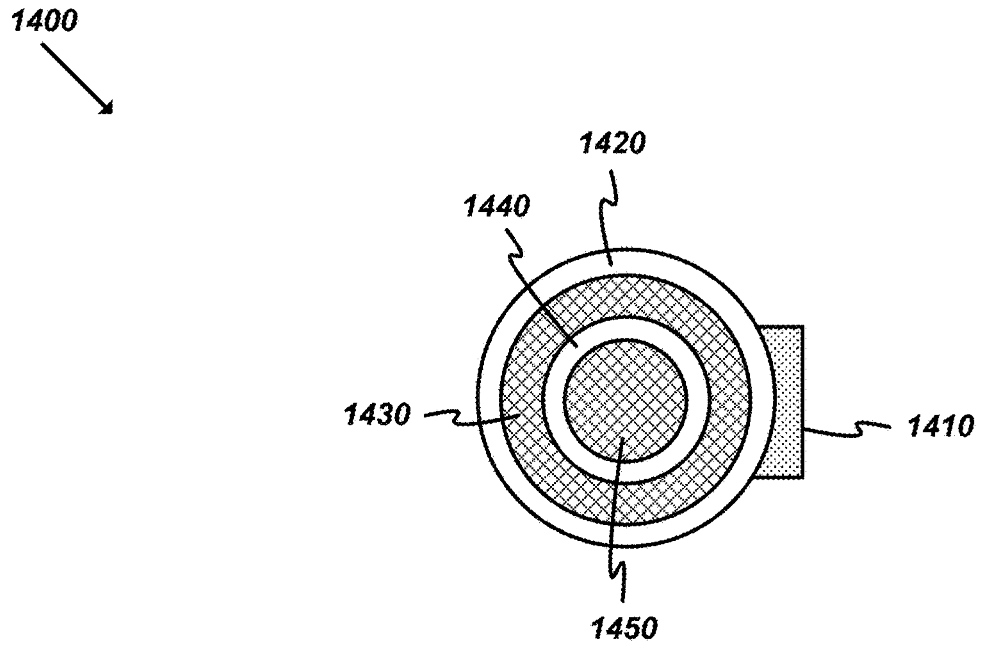
FIG. 14 illustrates a front elevation view of a concentric circular EA pad of one or more embodiments described herein.

FIG. 14 illustrates a front elevation view of a concentric circular EA pad 1400 of one or more embodiments described herein. As shown, the concentric circular EA pad 1400 may include an electrode 1410, an outer stiction polymer section 1420, an outer PBI section 1430, an inner stiction polymer section 1440, and an inner PBI section 1450.

Figure 15:
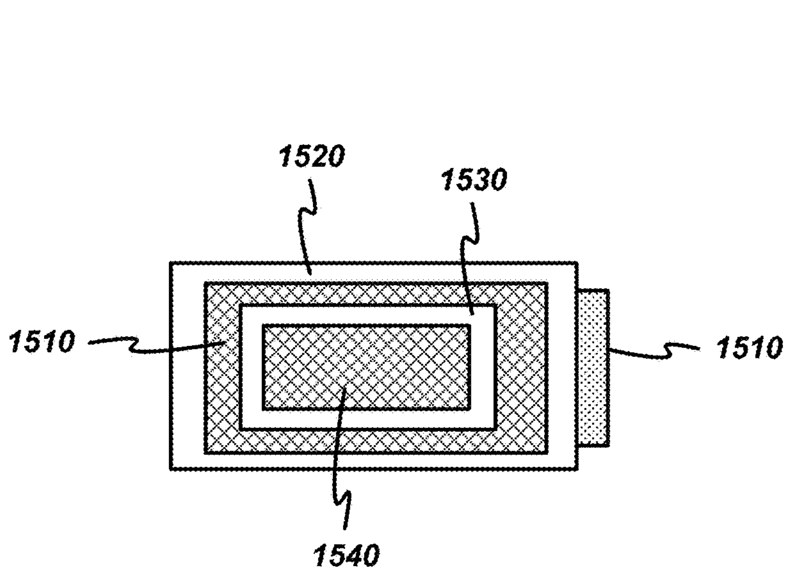
FIG. 15 illustrates a front elevation view of a concentric rectangular EA pad of one or more embodiments described herein.

FIG. 15 illustrates a front elevation view of a concentric rectangular EA pad 1500 of one or more embodiments described herein. As shown, the concentric rectangular EA pad 1500 may include an electrode 1510, an outer stiction polymer section 1520, an outer PBI section 1530, an inner stiction polymer section 1540, and an inner PBI section 1550.

Figure 16:
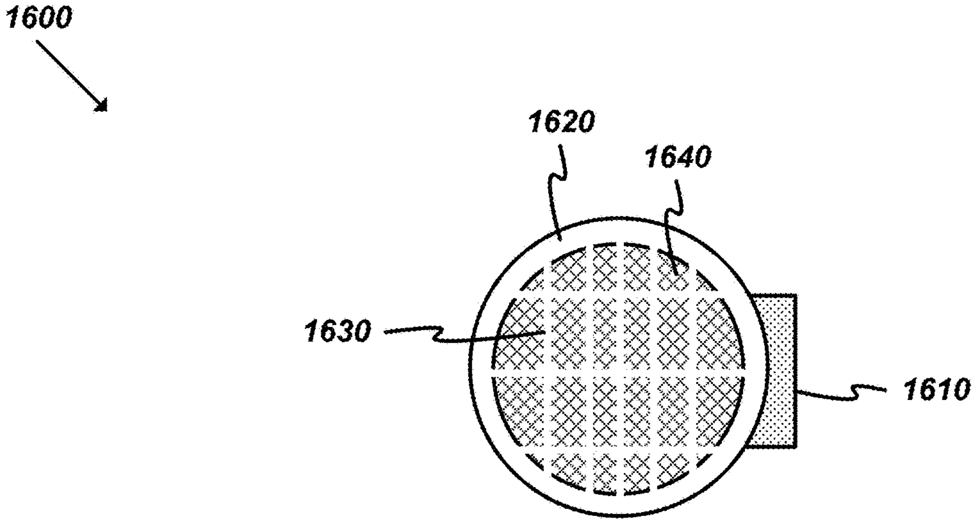
FIG. 16 illustrates a front elevation view of a non-concentric circular EA pad of one or more embodiments described herein.

FIG. 16 illustrates a front elevation view of a non-concentric circular EA pad 1600 of one or more embodiments described herein. As shown, the non-concentric circular EA pad 1600 may include an electrode 1610, an outer stiction polymer section 1620, a stiction polymer grid 1630, and a set of PBI sections 1640. Different embodiments may include various different grid patterns.

Figure 17:
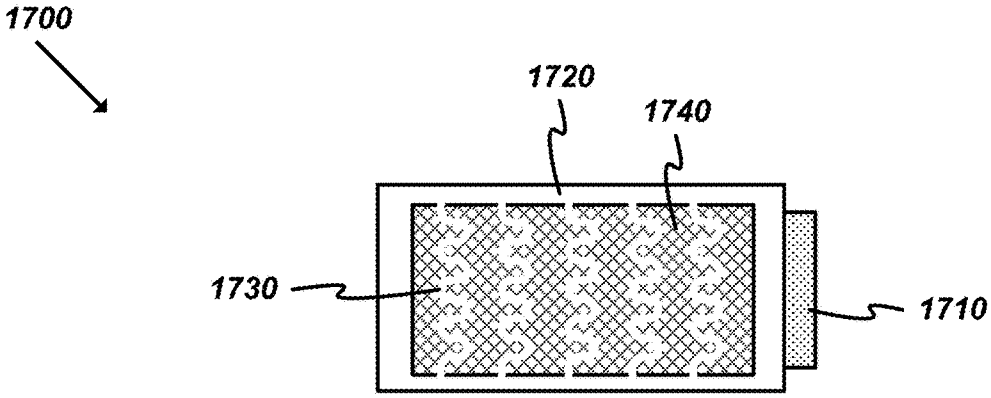
FIG. 17 illustrates a front elevation view of a non-concentric rectangular EA pad of one or more embodiments described herein.

FIG. 17 illustrates a front elevation view of a non-concentric rectangular EA pad 1700 of one or more embodiments described herein. As shown, the non-concentric rectangular EA pad 1700 may include an electrode 1710, an outer stiction polymer section 1720, a concave-convex stiction polymer section 1730, and a set of PBI sections 1740. Different embodiments may include various different stiction polymer patterns.

Figure 18:
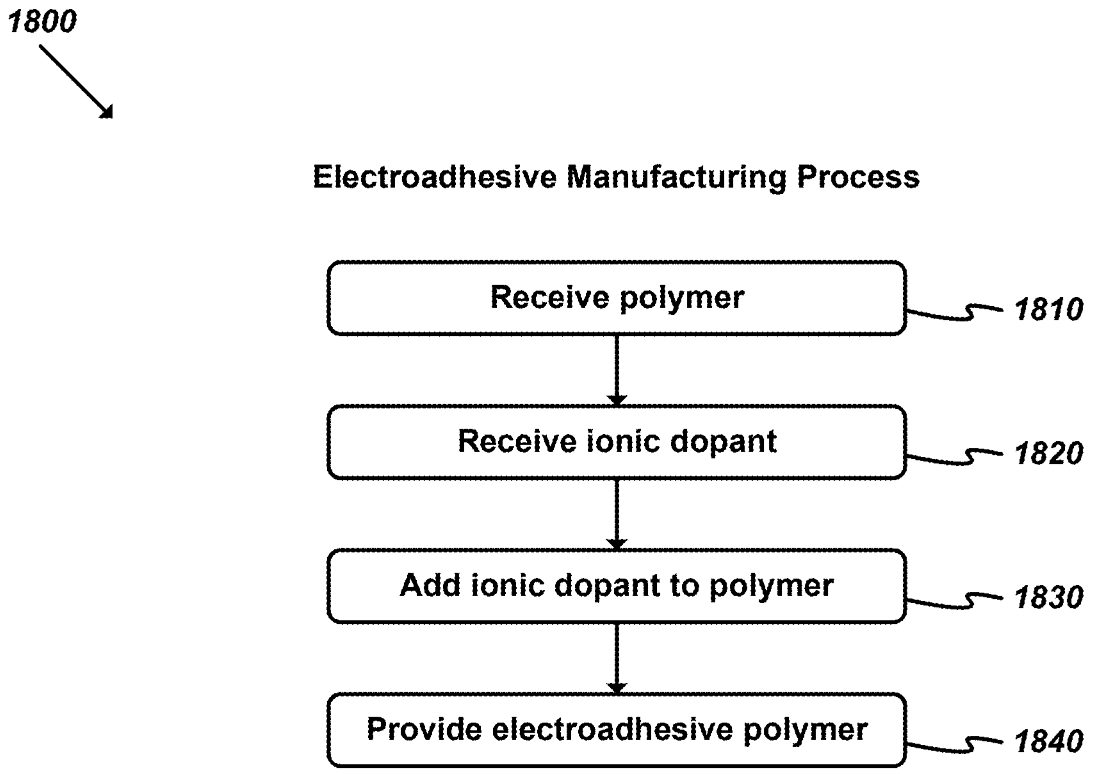
FIG. 18 illustrates a flow chart of an exemplary process that manufactures the EA polymer of some embodiments.

FIG. 18 illustrates an example process 1800 for manufacturing the EA polymer 100. The process may be used to fabricate EA polymer 100 in various forms (e.g., films, paints or coatings, etc.).

As shown, process 1800 may include receiving (at 1810) a polymer. A polymer, such as PBI may be received in various forms, as appropriate. In some embodiments, a film may be cast from a solution of PBI in dimethylacetamide solvent.

Process 1800 may include receiving (at 1820) an ionic dopant. An ionic dopant, such as LiCl, may be received in various appropriate forms.

The process may include adding (at 1830) the ionic dopant to the polymer. A small weight fraction of the ionic dopant may be dissolved into the PBI-solvent film.

As shown, process 1800 may include providing (at 1840) EA polymer 100. The EA polymer 100 may be provided in various appropriate form factors, such as films, paints or coatings, etc. having various different processing operations. For example, films cast from the polymer in solution may be dried in a convection oven to remove the solvent and may range in thickness from, for example, five μm to one mm and may include a small weight fraction (e.g., less than one percent) of solvent as plasticizer in a final composition.

One of ordinary skill in the art will recognize that process 1800 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel. Elements or sets of elements may be performed continuously and/or at regular intervals.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

The invention claimed is:

1. A clutch comprising:

a stator plate; and a conductive plate comprising electrically conductive material, wherein the stator plate is selectively coupled to the conductive plate when a voltage is applied to the stator plate;

wherein the stator plate comprises an electroadhesive (EA) polymer; wherein the EA polymer comprises polybenzimidazole (PBI), an ionic additive, and a plasticizer; wherein the ionic additive comprises alkali/alkaline earth metal halides, alkyl halides, aryl halides, acids, or ionic liquids; and wherein the ionic additive comprises lithium chloride (LiCl).

2. A clutch comprising: a stator plate; and a conductive plate comprising electrically conductive material, wherein the stator plate is selectively coupled to the conductive plate when a voltage is applied to the stator plate; wherein the stator plate comprises an electroadhesive (EA) polymer; wherein the EA polymer comprises polybenzimidazole (PBI), an ionic additive, and a plasticizer; and wherein the plasticizer comprises solvent or another chemical compound that increases softness and flexibility of the EA polymer.

3. A clutch comprising:

a first interlocking fin half assembly comprising:

a first base having a specified base thickness, width, and length; and a first array of fins coupled to the first base, each fin in the first array of fins having a specified fin thickness, width, and length, wherein each fin in the first array of fins has a specified spacing relative to adjacent fins, a second interlocking fin half assembly comprising:

a second base having the specified base thickness, width, and length; and a second array of fins coupled to the second base, each fin in the second array of fins having the specified fin thickness, width, and length, wherein each fin in the second array of fins has the specified spacing relative to adjacent fins, wherein each fin from the first array of fins has at least a portion of at least one surface coated with an electroadhesive (EA) polymer, and wherein each fin from the second array of fins has at least a portion of at least one surface coated with a conductive material.

4. The clutch of claim 3, wherein the EA polymer comprises polybenzimidazole (PBI), an ionic additive, and a plasticizer.

5. The clutch of claim 3, wherein the ionic additive comprises alkali/alkaline earth metal halides, alkyl halides, aryl halides, acids, or ionic liquids.

6. The clutch of claim 3, wherein the ionic additive comprises lithium chloride (LiCl).

7. The clutch of claim 3, wherein the plasticizer comprises solvent or another chemical compound that increases softness and flexibility of the EA polymer.

8. The clutch of claim 3, wherein the conductive material comprises steel.

* * * * *